United States Patent
Kuo et al.

(10) Patent No.: US 7,599,634 B2
(45) Date of Patent: Oct. 6, 2009

(54) SUBJECTIVE AND OBJECTIVE UNIVERSAL SUBSTRATE PRINTER ICC PROFILE SELECTION

(75) Inventors: Chung-Hui Kuo, Fairport, NY (US); Yee S. Ng, Fairport, NY (US); Hwai-Tzuu Tai, Rochester, NY (US); Dmitri A. Gusev, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 234 days.

(21) Appl. No.: 11/734,821

(22) Filed: Apr. 13, 2007

(65) Prior Publication Data

US 2008/0253783 A1    Oct. 16, 2008

(51) Int. Cl.
*G03G 15/00* (2006.01)
(52) U.S. Cl. .............. 399/45; 358/1.9; 399/15; 399/49
(58) Field of Classification Search .......... 399/45, 399/9, 49, 38, 341, 8, 15; 347/19; 358/1.9, 358/406.504
See application file for complete search history.

(56) References Cited

U.S. PATENT DOCUMENTS

| | | | |
|---|---|---|---|
| 5,234,783 A | 8/1993 | Ng | 430/45.53 |
| 5,995,714 A | 11/1999 | Hadley et al. | 358/1.9 |
| 6,563,524 B1 * | 5/2003 | Regimbal et al. | 399/15 X |
| 7,340,208 B2 * | 3/2008 | Ng | 399/341 X |
| 7,415,226 B2 * | 8/2008 | Sakai et al. | 399/38 X |
| 2003/0117639 A1 * | 6/2003 | Milton et al. | 358/1.9 X |
| 2004/0131371 A1 * | 7/2004 | Itagaki et al. | 399/49 |
| 2005/0190387 A1 * | 9/2005 | Hoshii | 358/1.9 |
| 2006/0188301 A1 | 8/2006 | Ng et al. | 399/341 |
| 2006/0285890 A1 | 12/2006 | Ng | 399/329 |
| 2007/0195361 A1 * | 8/2007 | Tomomatsu | 358/1.15 |

FOREIGN PATENT DOCUMENTS

WO    WO 2005/036869    4/2005

OTHER PUBLICATIONS

"ICC Profiles In Photoshop 6.0 And Later"; Jan. 18, 2007; 4 pages; http://kb.adobe.com/selfservice/viewContent.do?externalId=321382>.

* cited by examiner

*Primary Examiner*—Sophia S Chen
(74) *Attorney, Agent, or Firm*—Lawrence P. Kessler

(57) ABSTRACT

Forming a multicolor image on a receiver member wherein a database of custom color profiles based on substrate physical properties and printing process characteristics is established. A set of universal color profiles is determined based on physical properties of substrates from clustered custom profiles. One universal color profile is assigned to a target substrate from the set of universal color profiles based on objective or subjective feedback. Thereafter, a multicolor toner image is formed on the receiver member with toners of at least three different colors of toner pigments which form various combinations of colors at different pixel locations on the receiver member to form the multicolor toner image thereon using the assigned one color profile. Based on objective or subjective feedback, the selected one universal color profile is modified, or a different universal color profile is selected.

3 Claims, 4 Drawing Sheets

SUBJECTIVE AND OBJECTIVE UNIVERSAL SUBSTRATE PRINTER ICC PROFILE SELECTION

FIELD OF THE INVENTION

The invention relates to color reproduction, and more particularly to color electrostatographic printers wherein color toner images are deposited upon a receiver member where the universal profile set and method to assign a universal profile to each unknown receiver member substrate is optimized.

BACKGROUND OF THE INVENTION

In a digital electrophotographic modular printing apparatus of known type, such as for example, the NexPress 2100. printer available from Eastman Kodak Company, located in Rochester, N.Y., color toner images are formed sequentially in a plurality of color imaging modules arranged in tandem, and the toner images are successively electrostatically transferred to a receiver member adhered to a transport web moving through the modules. Commercial printing apparatus of this type typically employ intermediate transfer members in the respective color printing modules for the transfer to the receiver member of individual color separation toner images. Of course, in other electrostatographic printers, each color separation toner image may be directly transferred to a receiver member.

Digital electrostatographic printers having a three, four, or more color capability may also provide an additional toner depositing assembly for depositing a clear toner. The provision of a clear toner overcoat to a color print is desirable for providing protection of the print from fingerprints and reducing certain visual artifacts. However, a clear toner overcoat will add cost and may reduce color gamut of the print; thus, it is desirable to provide for operator/user selection to determine whether or not a clear toner overcoat will be applied to the entire print. In U.S. Pat. No. 5,234,783, issued on Aug. 10, 1993, in the name of Yee S. Ng, it is noted that in lieu of providing a uniform layer of clear toner, a layer that varies inversely according to heights of the toner stacks may be used instead as a compromise approach to establishing even toner stack heights. As is known, the respective color toners are deposited one upon the other at respective locations on the receiver member and the height of a respective color toner stack is the sum of the toner contributions of each respective color and provides the print with a more even or uniform gloss. In U.S. Pat. application Ser. No. 11/062,972, filed on Feb. 22, 2005, now U.S. Pat. No. 7,236,234, issued on Jun. 26, 2007, in the names of Yee S. Ng et al., a method is disclosed of forming a print having a multicolor image supported on a receiver member wherein a multicolor toner image is formed on the receiver member by toners of at least three different colors of toner pigments which form various combinations of color at different pixel locations on the receiver member to form the multicolor toner image thereon; forming a clear toner overcoat upon the multicolor toner image, the clear toner overcoat being deposited as an inverse mask; pre-fusing the multicolor toner image and clear toner overcoat to the receiver member to at least tack the toners forming the multicolor toner image and the clear toner overcoat; and subjecting the clear toner overcoat and the multicolor toner image to heat and pressure using a belt fuser to provide an improved color gamut and gloss to the image. The inverse masks, the pre-fusing conditions, and the belt fuser set points can be optimized based on receiver member types to maximize the color gamut.

In the current ICC workflow of a digital printing apparatus, a chosen printer profile is critical to the actual color rendition of the digital source document. The ICC profile associated with a substrate in a digital printing system is controlled by the adopted printing process as well as the physical properties of that substrate. For example, the same substrate might exhibit different physical dot gain characteristics in a toner-based printing process than that of an ink-based printing process. Furthermore, in the electrophotographic printing process, the controlling parameters of the fuser, such as fusing temperature and pressure, significantly affect the printable color gamut. Thus, a substrate-specific printer ICC profile, noted as a custom ICC profile, is needed for accurate color reproduction on each substrate. While the custom profile approach is essential for jobs demanding high color accuracy, the vast availability of all substrates creates a logistic problem of maintaining the custom profile database and can generate confusion among users as to locating the correct ICC profile for a particular substrate being used. The number of custom ICC profiles for each substrate will increase even further when different halftone screens and colorant combinations also affect the color reproduction. Moreover, any modification on the printing process and/or physical/spectral properties of adopted colorants will render all previously-created printer ICC profiles less accurate or even obsolete. However, due to the significant change in the color gamut, new color profiles will need to be built for each receiver member to be used so as to obtain the desired printed color.

It is recognized that rebuilding color profiles for each receiver member substrate used based on the process described above is a costly approach. It would therefore be desirable to provide a method and apparatus that can make use of a few universal color profiles based on receiver member characteristics that gives reasonable color accuracy for the receiver members used, with improved color gamut and gloss, without having to rebuild color profiles for all receiver members. The current practice to curtail the ever-increasing size of substrate-specific printer ICC profiles is to adopt a set of universal ICC profiles according to the physical properties of substrates, which is less accurate than the aforementioned custom profile approach. The receiver member substrates are generally characterized as coated/uncoated, glossy/matte. In assigning a universal ICC profile to one substrate depending only on the physical properties of a substrate without measuring reproduced color, this technique is unable to cope with modifications of the printing process.

SUMMARY OF THE INVENTION

By this invention, a universal printer ICC profile selection technique for a particular receiver member substrate is proposed in which there is combined a set of static universal printer ICC profiles and feedback information via subjective evaluation or objective color measurement. The set of static universal printer ICC profiles is obtained by clustering the available custom ICC profiles for all substrates into a predefined number of universal profile paradigms such that the overall error between the custom ICC profiles and each associated universal profile paradigm is minimized. That is, the obtained set of universal printer ICC profiles is the optimal choice to approximate the performance of the entire set of the custom ICC profiles. Assigning one universal ICC profile to a target receiver member substrate from the predetermined set is based on feedback information from visual evaluation or objective color measurement, where a test suite containing various images and graphics or reduced set of color patches is printed on the target substrate. The combined effect on color reproduction by the setting of the printing process and the physical properties of the target receiver member substrate is embodied on the printed subjective or objective target. The subjective test suite is printed on the target substrate via all, or selected, predefined universal ICC profiles under the subjective universal profile selection approach. A user (e.g., customer) will evaluate the prints and identify the most preferred realization of the test suite. The associated universal ICC profile paradigm is then selected as the universal ICC profile for such substrate. On the other hand, the objective target with limited number of color patches is printed and measured with a colorimetric device. The number of color patches is much smaller than that needed to create a custom ICC printer profile, and this smaller number of color patches captures a significant portion of color variation with respect to substrate difference. A universal profile paradigm selection technique will automatically assign one universal ICC profile for a target receiver member substrate without user interference.

The above and other aspects of the invention are realized in accordance with a first aspect of the invention wherein there is provided a method of forming a multicolor image on a receiver member with toners of at least three different colors of toner pigments which form various combinations of color at different pixel locations on the receiver member to form the multicolor toner image thereon using a chosen suite of universal color profiles based on receiver member characteristics; fusing the clear toner overcoat and the multicolor toner image using a belt fuser to fix the toner image to the receiver member; and evaluating the image either objectively or subjectively and making any necessary changes to the profile, or choosing a different universal color profile, based on the objective/subjective evaluation.

BRIEF DESCRIPTION OF THE DRAWINGS

In the detailed description of the preferred embodiments of the invention presented below, reference is made to the accompanying drawings, in some of which the relative relationships of the various components are illustrated, it being understood that orientation of the apparatus may be modified. For clarity of understanding of the drawings some elements have been removed and relative proportions depicted of the various disclosed elements may not be representative of the actual proportions, and some of the dimensions may be selectively exaggerated.

DETAILED DESCRIPTION OF THE INVENTION

Figure 1A:
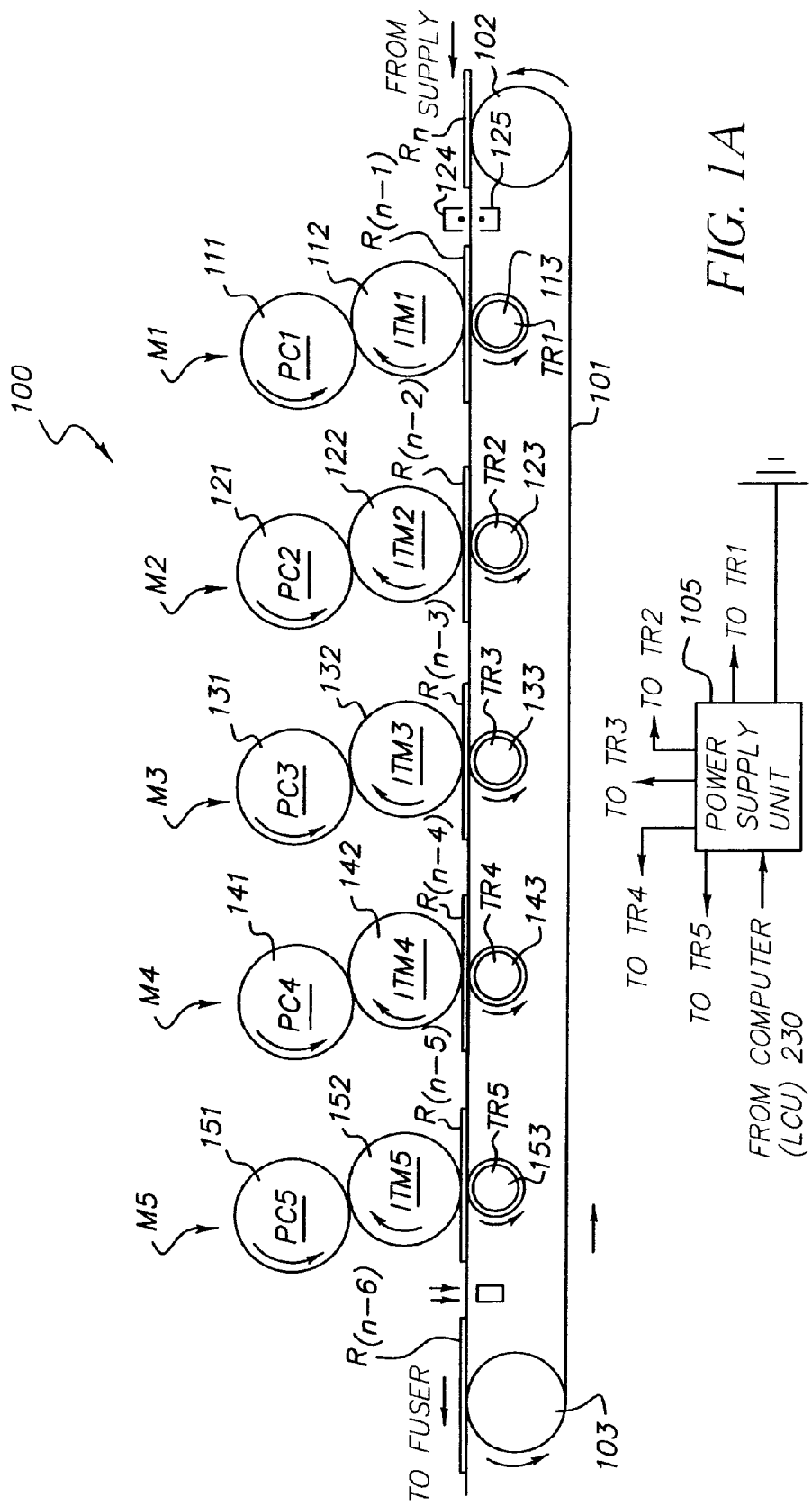
FIGS. 1A and 1B are schematic illustrations of a tandem electrophotographic print engine or printer apparatus, having five printing assemblies or modules that may be used in accordance with the present invention to generate multicolor prints.
Figure 1B:
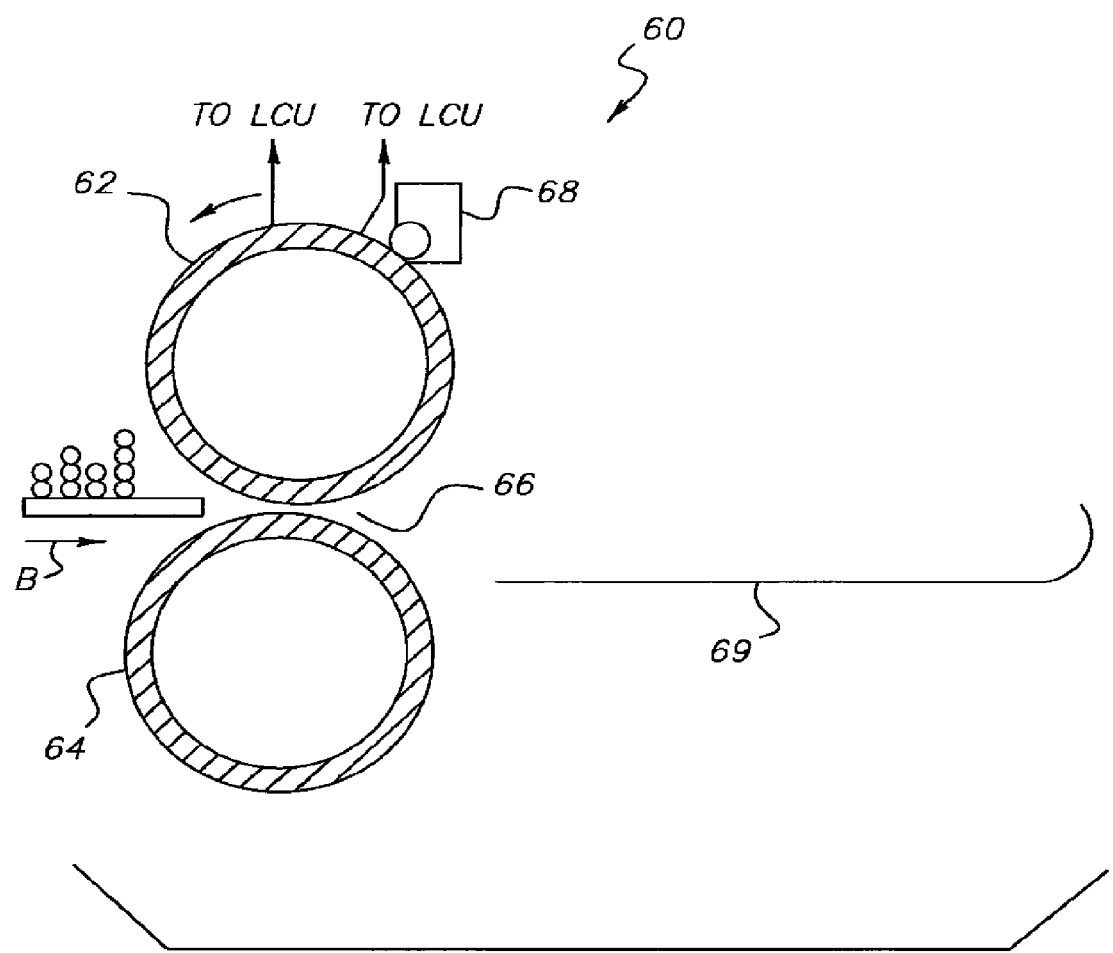

FIGS. 1A and 1B are side elevational views schematically showing portions of an exemplary electrophotographic print engine or printer apparatus 100 suitable for printing multicolor toner images on receiver members. Although one embodiment of the present invention involves printing using an electrophotographic engine having five sets of single-color image printing assemblies or modules M1-M5 that are arranged in a so-called tandem arrangement, the present invention contemplates that three, four, five, or more than five colors may be combined on a single receiver member. The present invention further contemplates that the images formed therein may also be generated using electrographic writers and thus the apparatus of the invention is broadly referred to as an electrostatographic reproduction or printer apparatus. In its broader aspects, the present invention contemplates that other processes may be used to create the multicolor images.

In FIG. 1A the exemplary electrostatographic printer apparatus 100 has a number of tandemly arranged electrostatographic image forming modules or printing assemblies M1, M2, M3, M4, and M5. Each of the modules, M1 through M4, generates a single-color toner image for transfer to a receiver member successively moved through the modules. Module M5 is used to provide a clear toner overcoat as will be described in greater detail below. Each receiver member, during a single pass through the five modules, can have transferred in registration thereto, up to four single-color toner images to form a multicolor image with a clear toner overcoat. As used herein, the term multicolor implies that in an image formed on the receiver member, has combinations of subsets of plural primary colors combined to form other colors on the receiver member, at various locations on the receiver member; and the plural primary colors participate to form process colors in at least some of the subsets, wherein each of the primary colors may be combined with one more of the other primary colors at a particular location on the receiver member to form a color different than the specific color toners combined at that location. In a particular embodiment, M1 forms black (K) toner color separation images, M2 forms yellow (Y) toner color separation images, M3 forms magenta (M) toner color separation images, and M4 forms cyan (C) toner color separation images. Other printing assemblies or modules may be added before the clear toner printing assembly or module to form additional colors on the receiver member. Thus, additional modules may form one of red, blue, green, or other fifth or more color separation images. It is well known that the four primary colors: cyan, magenta, yellow, and black, may be combined in various combinations of subsets thereof to form a representative spectrum of colors and have a respective gamut or range dependent upon the materials used and process used for forming the colors. A fifth color may be added to improve the color gamut. In addition to adding to the color gamut, the fifth color may also be used as a specialty color toner image, such as for making proprietary logos.

Receiver members are delivered from a paper supply unit (not shown) and transported through the modules. The receiver members are adhered (e.g., preferably electrostatically, via coupled corona tack-down chargers 124, 125) to an endless transport web 101 entrained and driven around rollers 102, 103. Alternatively, mechanical devices such as grippers, as is well known, may be used to adhere the receiver members to the transport web 101. Each of the respective modules (M1 through M5) includes a photoconductive imaging roller, an intermediate transfer member roller, and a transfer backup roller. Thus in module M1, a black color toner separation image can be created on the photoconductive imaging roller 111 (PC1), transferred to intermediate transfer member 112 (ITM1) and transferred again to a receiver member ($R_{(n-1)}$) moving through a transfer assembly, which transfer assembly includes the intermediate transfer member 112 (ITM1) forming a pressure nip with a transfer backup roller 113 (TR1). Similarly, modules M2, M3, M4, and M5 include, respectively: PC2, ITM2, TR2 (121, 122, 123); PC3, ITM3, TR3 (131, 132, 133); PC4, ITM4, TR4 (141, 142, 143); and PC5, ITM5, TR5 (151, 152, 153). A receiver member $R_n$, arriving from the supply, is shown passing over roller 102 for subsequent entry into the transfer assembly of the first module, M1, in which the preceding receiver member $R_{(n-1)}$. is shown. Similarly, receiver members $R_{(n-2)}$, $R_{(n-3)}$, $R_{(n-4)}$, and $R_{(n-5)}$ are shown moving respectively through the transfer assemblies of modules M2, M3, M4, and M5. An unfused print formed on receiver member $R_{(n-6)}$. is moving as shown towards a fuser 60 shown in FIG. 1B, for fusing the unfused print to the receiver member by application of heat and/or pressure. A cleaning assembly (not shown) for cleaning web 101 is typically provided to enable reuse thereof.

A power supply unit 105 provides individual transfer currents to the transfer backup rollers TR1, TR2, TR3, TR4, and TR5 respectively. A Logic and Control Unit (LCU) 230 (see FIG. 2) includes one or more computers, and in response to signals from various sensors associated with the printer apparatus 100 provides timing and control signals to the respective components to provide control of the various components and process control parameters of the printer apparatus. That is, LCU 230 includes a microprocessor and suitable tables and control software which is executable by the LCU 230. The control software is preferably stored in memory associated with the LCU 230. Sensors associated with the printer apparatus produce, or are responsive to, timing and control signals related to process elements of the printer apparatus In response to the sensors, the LCU 230 issues command and control signals that adjust, and otherwise generally nominalizes and/or optimizes the operating parameters of the printer apparatus 100.

Figure 2:
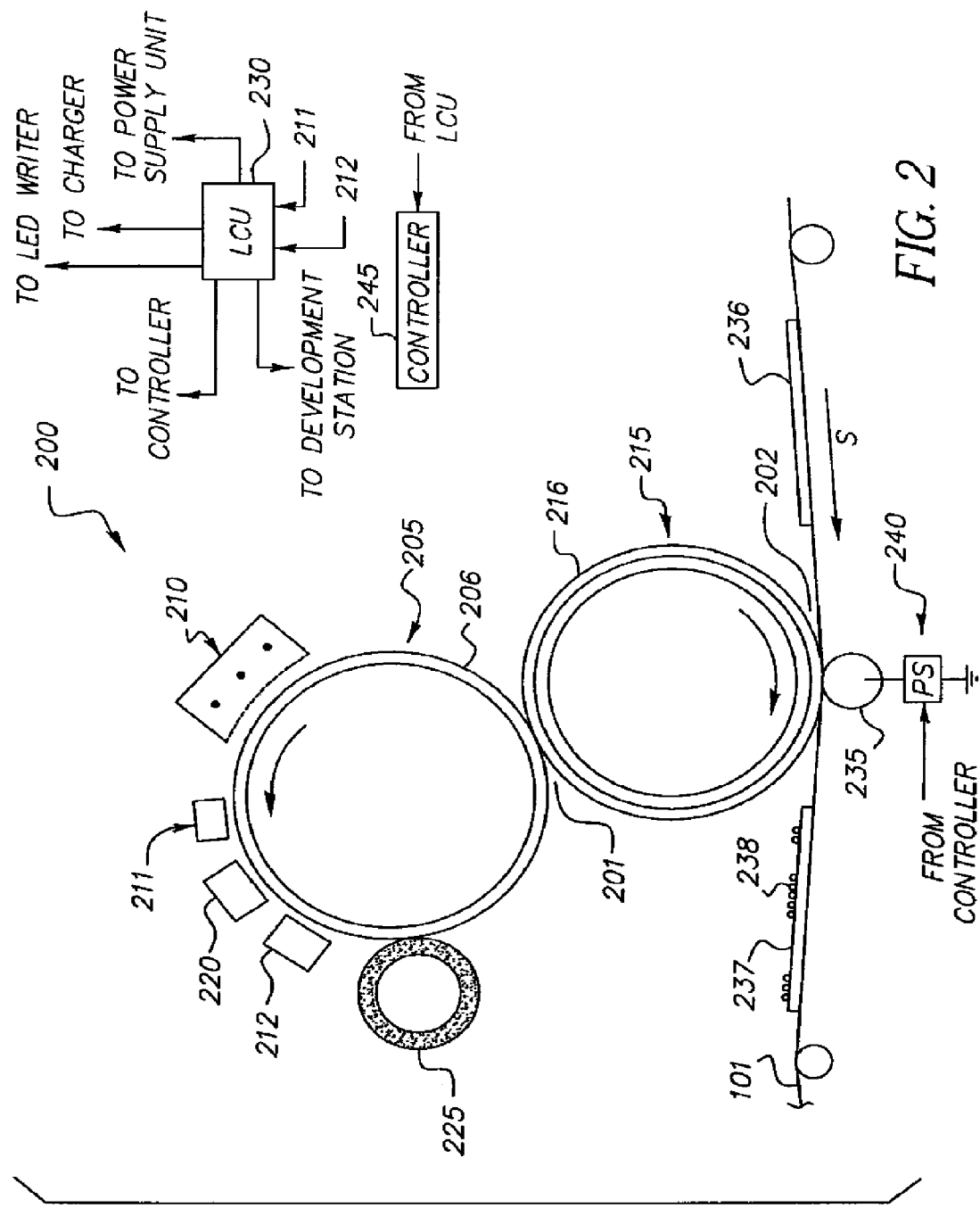
FIG. 2 is a schematic illustration of a representative printing assembly or module used in the print engine apparatus of FIG. 1A showing additional details thereof.

With reference to FIG. 2 wherein a representative one of the color-printing modules M1-M5 is shown, each color-printing module of the printer apparatus 100 includes a plurality of electrophotographic imaging subsystems for producing a respective single-color toned image. Included in the representative module 200 is a primary charging subsystem 210 for uniformly electrostatically charging a surface 206 of a photoconductive imaging member 205, shown in the form of an imaging cylinder, an exposure subsystem 220 for image-wise modulating the uniform electrostatic charge by exposing the photoconductive imaging member 205 to form a latent electrostatic color separation image in the respective color, a development subsystem 225 for toning the image-wise exposed photoconductive imaging member 205 with toner of the respective color, an intermediate transfer member 215 for transferring the respective color separation image from the photoconductive imaging member 205 through a transfer nip 201 to the surface 216 of the intermediate transfer member 215, and through a second transfer nip 202 from the intermediate transfer member to a receiver member (receiver member 236 shown prior to entry into the second transfer nip 202, and receiver member 237 shown subsequent to transfer of the toned color separation image) which receives the respective toned color separation images 238 in superposition to form a composite multicolor image thereon. Transfer to a receiver member is affected by an electrical field provided to a backup roller 235 from a power source 240. A fifth module or printing assembly, M5, is substantially identical to the other modules except that it may contain a similar type of toner, which is of a specific selected color or may be lacking pigment (i.e., a clear toner).

Subsequent to transfer of the respective color separation images, one from each of the respective printing subsystems or modules, and transfer of the clear toner overcoat upon the multicolor image formed by the color separation images to a receiver member, such receiver member is advanced to a fusing subsystem to fuse or at least tack the multicolor toner image and the clear toner overcoat "image" to the receiver member. Additional devices provided for control may be assembled about the various module elements, such as for example a meter 211 for measuring the uniform electrostatic charge and a meter 212 for measuring the post-exposure surface potential within a patch area of a latent image patch formed from time to time in a non-image area on surface 206. Further details regarding the printer apparatus 100 are also provided in U.S. Pat. No. 6,608,641, issued on Aug. 19, 2003, in the name of Peter S. Alexandrovich et al.

Associated with each of the color-printing modules 200 is a main LCU 230, which receives input signals from the various sensors associated with the printer apparatus and sends control signals to the chargers 210, the exposure subsystem 220 (e.g., LED writers) and the development subsystem 225 of the modules. Each module may also have its own respective controller coupled to the printer apparatus main LCU 230.

Subsequent to the transfer of the three, four, or more color toner separation images and the clear toner overcoat image in superposed relationship to each receiver member, such receiver member is then de-tacked from transport web 101 (see FIG. 1A) and sent in a direction indicated by arrow B (in FIG. 1B) to a fusing assembly 60 to fuse, or fix, the dry toner images to the receiver member. The transport web 101 is then reconditioned for reuse by cleaning and providing charge to both surfaces, which neutralizes charge on the opposing surfaces of the transport web.

The electrostatic image is developed, for example, by application of pigmented marking particles to the latent image bearing photoconductive member 205 by the respective exposure subsystem 220, which development subsystem 225 preferably employs SPD (Small Particle Dry) developers. Each of the development subsystems 225 is respectively electrically biased by a suitable respective voltage, to develop the respective latent image, which voltage may be supplied by a power supply or by individual power supplies (not illustrated). Preferably, the respective developer is a two-component developer that includes toner marking particles and magnetic carrier particles. Each color development subsystem 225 has a particular color of pigmented toner marking particles associated respectively therewith for toning. Thus, each of the four modules, M1 through M4, creates a different color marking particle image on the respective photoconductive member 205. Alternatively, the developer may be a singe-component developer. It is also contemplated that the color toners may each be associated with a liquid developer. As will be discussed further below, a clear toner development assembly may be substituted for one of the pigmented developer assemblies so that the module M5 operates in similar manner to that of the other modules which deposits pigmented toner; however, the development assembly of the clear toner module has toner particles associated respectively therewith that are similar to the toner marking particles of the color development assemblies but without the pigmented material incorporated within the toner.

With reference to FIG. 1B, the toner image carrying receiver members are transported seriatim to a fusing assembly 60, which fixes or at least tacks the toner particles to the respective receiver members by the application of heat and/or pressure. More particularly, fusing assembly 60 includes a heated fusing roller 62 and an opposing pressure roller 64 that forms a fusing nip 66 there between. Fusing assembly 60 also includes a release fluid application subassembly generally designated 68 that applies release fluid, such as, for example, silicone oil, to fusing roller 62. The release fluid substantially prevents toner particles from adhering to the fuser roller 62.

A receiver member carrying the fused image (or at least tacked image) is transported from the fusing assembly 60 along a path to either a remote output tray 69 or to any suitable output accessory, such as an auxiliary fuser or glossing assembly such as might be necessary if a clear toner overcoat is to be provided.

As discussed above, with the present ICC workflow of a digital printing system, such as the printer apparatus 100, the chosen printer profile is critical to the actual color rendition of the digital source document. The ICC profile associated with a receiver member substrate in a digital printing system is controlled by the adopted printing process as well as the physical properties of that particular substrate. Furthermore, in the electrophotographic printing process, the controlling parameters of the fuser, such as fusing temperature and pressure, significantly affect the printable color gamut. Thus, a receiver member substrate-specific printer ICC profile, noted, as a custom ICC profile, is needed for accurate color reproduction on each selected substrate. Of course, any modification of the printing process and/or physical/spectral properties of adopted colorants will render all previously-created printer ICC profiles less accurate or even obsolete. The current practice is to adopt a set of universal ICC profiles according to physical properties of substrates, which is less accurate than the aforementioned custom profile approach. Because of assigning a universal ICC profile to one substrate depending only on the physical properties of a substrate without measuring reproduced color, this technique is unable to accurately accommodate for any modification of the printing process.

While the prior art has provided for some user input, for example, relating to a set of receiver member substrate attributes (such as substrate type, weight, etc.), this is done without feedback measurement (either psychophysical/subjective or via physical measurements/objective) of the actual substrate to be used. It, therefore, does not take into consideration that either the individual user's preference (subjective) can be different from the "universal" person, or that some receiver member substrate description is not sufficient to point to the correct universal profile to use. This is due to the fact that the substrate type, etc., does not go into detail of the substrate composition, such as what material and fiber are being used, so that the interaction of the substrate material/composition in relationship to the fuser, for example, is not taken into consideration. This may result in dot gain difference from the universal that results in a color difference, or in other words, not the most optimum selection of the available universal profile.

To overcome these issues, a database is provided having a built profile for more than 400. substrates, classified into a few universal profiles that provide the minimum difference in colors to the 400. plus substrates. Of course, those 400. plus substrates that are supported, a LUT that points to which one of the universal profiles to use with a respective substrate, will get the job done. However, in order to deal with new substrates (outside of the original 400 plus), new methodology comes into play by including a subjective user preference feedback and the objective measure feedback to take care of the potential problem caused by substrate composition but the same substrate type (e.g., coated glossy), such as dot gain difference from the norm.

From an objective perspective, a few key colors (those that have the most sensitivity to dot gain difference, for example) are printed with the selected receiver member substrate, and measurements are made. Since only a few patches are measured, rather than hundreds or even thousands of patches used in order to build a specific color profile, measurement time is comparatively small, which can be further combined into the printer calibration/linearization procedure with minimal impact on productivity. One set of key colors obtained from analyzing the entire collection of current substrate-specific ICC profiles is listed below:

| Cyan | Magenta | Yellow | Black |
| --- | --- | --- | --- |
| 0.1 | 0.4 | 0.1 | 0 |
| 0.2 | 0.7 | 0.2 | 0.6 |
| 0 | 0.7 | 0.2 | 0.6 |
| 0.2 | 0.7 | 0.2 | 0.4 |
| 0 | 0.7 | 0 | 0.4 |
| 0.7 | 0 | 0 | 0.2 |
| 0 | 0.2 | 0 | 0.4 |
| 0.1 | 0.4 | 0 | 0.2 |
| 0.7 | 0.4 | 0 | 0.4 |
| 0.1 | 0.7 | 0.1 | 0.2 |
| 1.0 | 0 | 0.2 | 0.6 |
| 0.1 | 0.7 | 0.4 | 0.2 |
| 0.4 | 0.7 | 0.2 | 0.2 |
| 0 | 0.7 | 0.7 | 0.2 |
| 0.7 | 0.2 | 0 | 0.4 |
| 0.1 | 1.0 | 0.4 | 0.2 |

From the measurement and the general substrate description (such as those used in the prior art), a more correct universal profile can be chosen. The objective measurement can further be supplemented by the subjective approach of printing a selected set of images using a plurality of universal profiles (for example, seven), so that the user can use their personal preference for selection.

With a single pass of the receiver member substrate through the four color printing modules and the clear toner printing assembly M1 through M5 of printer apparatus 100, a receiver member substrate in the form of a sheet, which may be of a paper, plastic, coated metal, or a textile material, receives four color toner separation images and a clear coating formed thereon. Typically, the parameters for nominal fusing of a typical receiver member substrate, such as paper, will be dependent upon the thickness and/or weight of the substrate and its surface characteristics, such as manufactured gloss finish or matte finish. Subsequent to fusing, the image formed on the substrate surface is complete, and no further processing of this receiver member substrate is required, except for perhaps forming another image on the opposite surface, i.e. duplex image formation.

Figure 3:
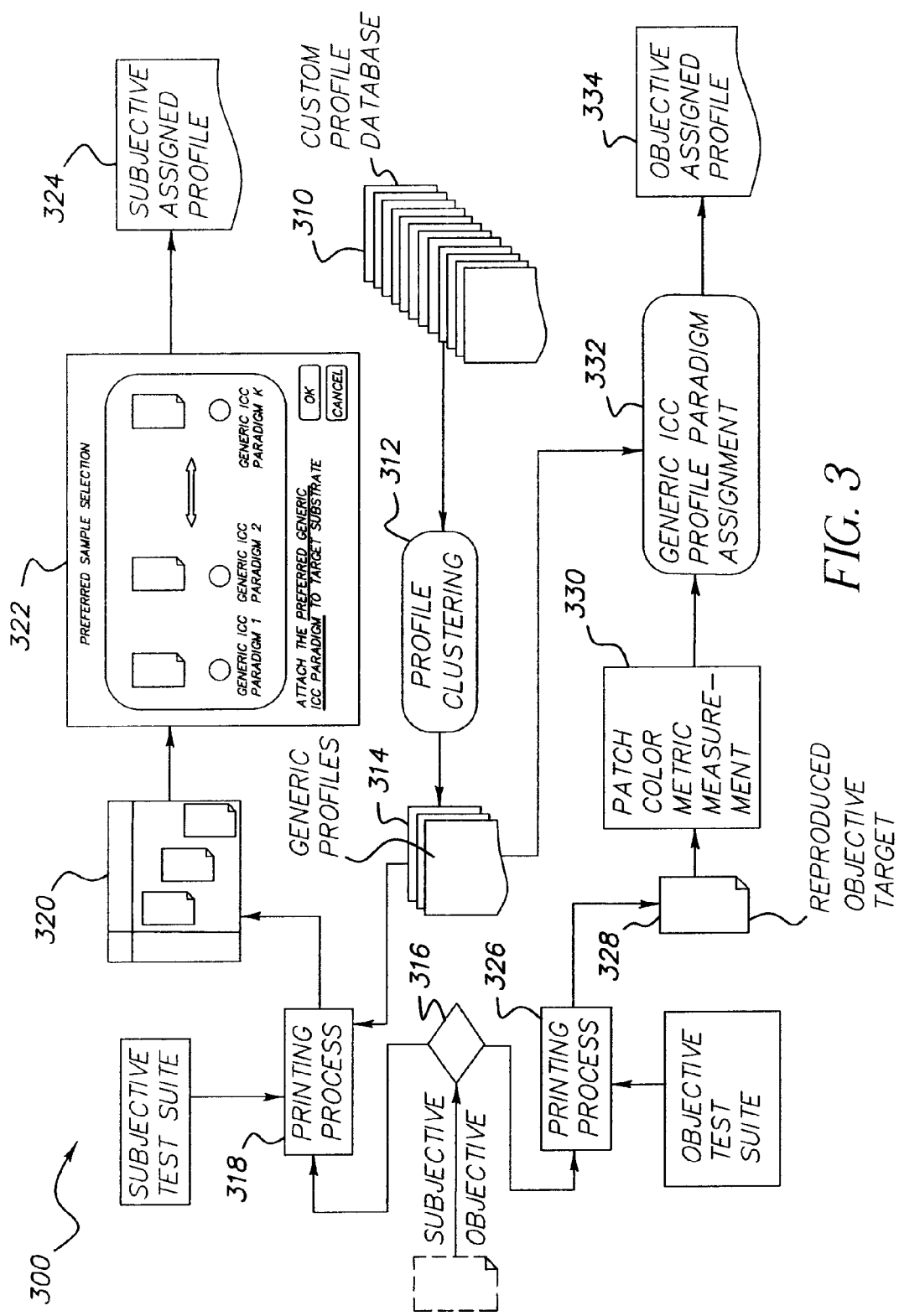
FIG. 3 is a flowchart illustrating selection and modification of a color profile for forming a multicolor image on a receiver member substrate, according to this invention.

To enable the number decrease with universal receiver member substrate printer ICC profiles, the universal substrate printer ICC profile selection technique, proposed by this invention, combines a set of static universal printer ICC profiles and feedback information via subjective evaluation or objective color measurement. With reference to the flow chart 300 shown in FIG. 3, available custom ICC profiles for all receiver member substrates are collected (Step 310) and clustered (Step 312) into a predefined number of universal profile paradigms (Step 314) such that the overall error between the custom ICC profiles and each associated universal profile paradigm is minimized. That is, the ICC profile set obtained in Step 314 is the optimal choice to approximate the performance of the entire set of the custom ICC profiles for a target receiver member substrate. Assigning one universal ICC profile to a target substrate from the predetermined set is based on feedback information from visual evaluation or objective color measurement, where a test suite containing various images and graphics or reduced set of color patches is printed on the target receiver member substrate.

The technique of color profile selection by visual (i.e., subjective) or objective color measurement is user determined in Step 316.

The combined effect on color reproduction by the setting of the printing process and the physical properties of the target receiver member substrate is embodied on the selected subjective or objective target when printed on such target substrate. The subjective test suite is printed on the target substrate (Step 318) via all predefined universal ICC profiles under the subjective universal profile selection approach. A user (i.e., customer observer, etc.) will evaluate the prints (Step 320) and identify (Step 322) the most preferred realization, by such user, of the test suite. The associated universal ICC profile paradigm is then selected (Step 324) as the universal ICC profile for the particular receiver member substrate.

On the other hand, the objective target with a limited number of color patches is printed (Step 326) and thereafter measured (Step 328) with a suitable colorimetric device. The number of color patches is much smaller than the one needed to create a custom ICC printer profile, and in the reproduced objective target (Step 330), they should capture a significant portion of color variation with respect to substrate difference. A universal profile paradigm selection technique (Step 332) will then automatically assign (Step 334) a universal ICC profile for the target receiver member substrate without additional user input.

The invention has been described in detail with particular reference to certain preferred embodiments thereof, but it will be understood that variations and modifications can be effected within the spirit and scope of the invention.

PARTS LIST

| | |
|---|---|
| 60 | Fusing assembly |
| 62 | Fusing roller |
| 64 | Pressure roller |
| 66 | Fusing nip |
| 68 | Release fluid application subassembly |
| 69 | Remote output tray |
| 101 | Transport web |
| 102, 103 | Roller |
| 105 | Power supply unit |
| 111 (PC1), 121 (PC2), 131, (PC3), 141 (PC4), 151 (PC5) | Photoconductive imaging rollers |
| 112 (ITM1), 122 (ITM2), 132 (ITM3), 142 (ITM4), 152 (ITM5) | Intermediate transfer members |
| 113 (TR1), 123 (TR2), 133 (TR3), 143 (TR4), 153 (TR5) | Transfer backup rollers |
| 124, 125 | Corona tack-down chargers |
| 200 | Module |
| 201 | Transfer nip |
| 202 | Transfer nip |
| 205 | Photoconductive imaging member |
| 206 | Surface |
| 210 | Primary charging subsystem |
| 211, 212 | Meters |
| 215 | Intermediate transfer member |
| 216 | Surface |
| 220 | Exposure subsystem |
| 225 | Development subsystem |
| 230 | Logic and Control Unit (LCU) |
| 235 | Backup roller |
| 236, 237 | Receiver members |
| 238 | Color separation image |
| 240 | Power source |
| 245 | Controller |
| 300 | Flowchart |
| 310 | Step - Collect available custom ICC profiles |
| 312 | Step - Cluster available custom ICC profiles |
| 314 | Step - Number of redefined universal profile paradigms |
| 316 | Step - Determine visual evaluation or objective color measurement |
| 318 | Step - Print subjective test suite on target substrate |
| 320 | Step - User evaluation of prints |
| 322 | Step - User identification of most preferred print |
| 324 | Step - Select universal ICC profile paradigm |
| 326 | Step - Print objective target with limited number of color patches |
| 328 | Step - Colorimetric measurement of color patches |
| 330 | Step - Reproduced objective target |
| 332 | Step - Universal color profile paradigm selection technique |
| 334 | Step - Assign a universal ICC profile for the target |
| B | Arrow representing the direction of the receiver member |
| M1 | Module - black (K) |
| M2 | Module - yellow (Y) |
| M3 | Module - magenta (M) |
| M4 | Module - cyan (C) |
| M5 | Module - clear/specialty |
| $R_n$, $R_{(n-1)}$, $R_{(n-2)}$, $R_{(n-3)}$, $R_{(n-4)}$, $R_{(n-5)}$, $R_{(n-6)}$ | Receiver members |
| S | Arrow representing the direction of the receiver member |

What is claimed is:

1. A method of forming a multicolor image on a receiver member substrate comprising:

establishing a database of custom color profiles based on receiver member substrate physical properties and printing process characteristics;

determining a set of universal color profiles based on physical properties of receiver member substrates from clustered custom profiles;

assigning one universal color profile to a target receiver member substrate from the set of universal color profiles;

forming a multicolor toner image on the receiver member substrate with toners of at least three different colors of toner pigments which form various combinations of colors at different pixel locations on the receiver member substrate to form the multicolor toner image thereon using the assigned one universal color profile;

providing objective or subjective feedback relative to said formed multicolor toner image, said objective feedback being based on color measurement, and said subjective feedback being based on visual evaluation including color patches formed using different universal profiles, and evaluated by a user to determine user preference; and modifying said one universal color profile, or selecting a different universal color profile, based on objective or subjective feedback.

2. A method of forming a multicolor image on a receiver member substrate according to claim 1 wherein said objective feedback color measurement is from a limited number of color patches.

3. A method for obtaining a color profile for forming a multicolor image on a receiver member substrate comprising the method of:

establishing a database of custom color profiles based on receiver member substrate physical properties and printing process characteristics;

assigning one universal color profile to a target receiver member substrate from a set of universal color profiles; and modifying said one universal color profile based on objective or subjective feedback obtained from a multicolor toner image on the receiver member substrate with toners of at least three different colors of toner pigments which form various combinations of colors at different pixel locations on the receiver member substrate, said objective feedback being based on color measurement, and said subjective feedback visual evaluation including color patches formed using different universal profiles, and evaluated by a user to determine user preference.

* * * * *